(No Model.) 5 Sheets—Sheet 1.

M. W. SEWALL.
CABLE RAILWAY.

No. 533,562. Patented Feb. 5, 1895.

WITNESSES:
W. H. Graham
Chas. L. Pashley

INVENTOR
Minott W. Sewall
BY
W. H. Graham
ATTORNEY (No Model.) 5 Sheets—Sheet 2.

M. W. SEWALL.
CABLE RAILWAY.

No. 533,562. Patented Feb. 5, 1895.

WITNESSES:
W. H. Graham.
George S. Bernard.

INVENTOR.
Minott W. Sewall
BY
Geo. M. Graham
ATTORNEY.

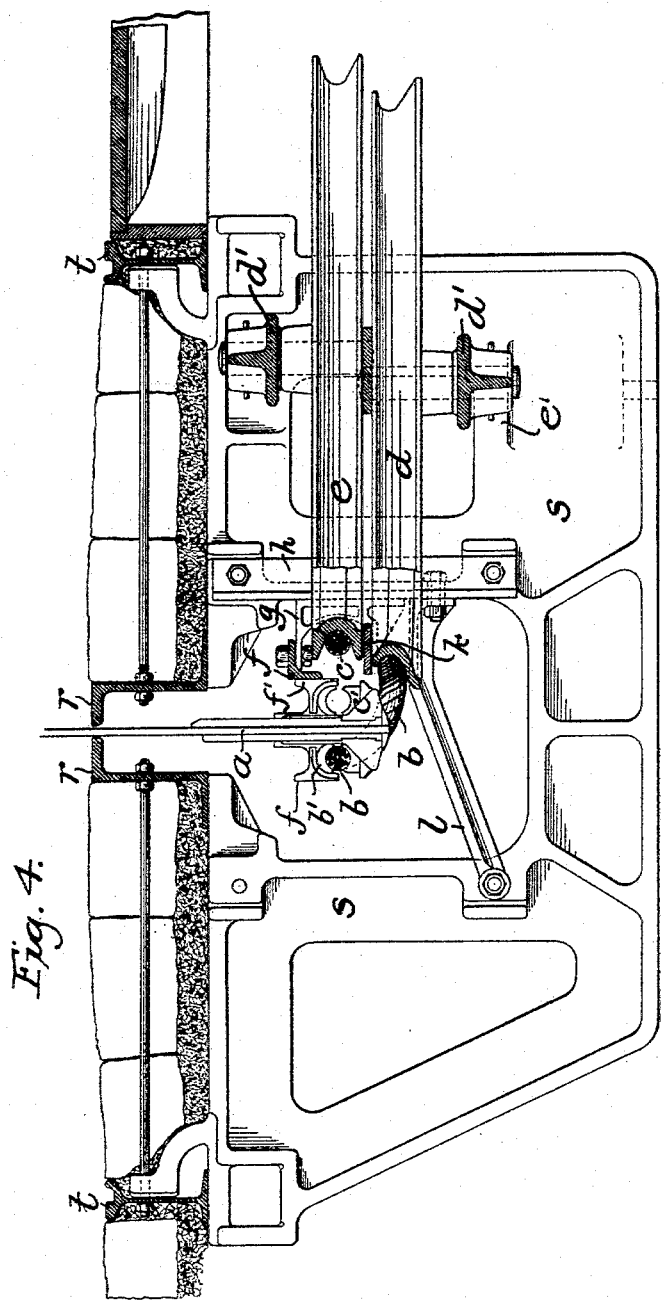

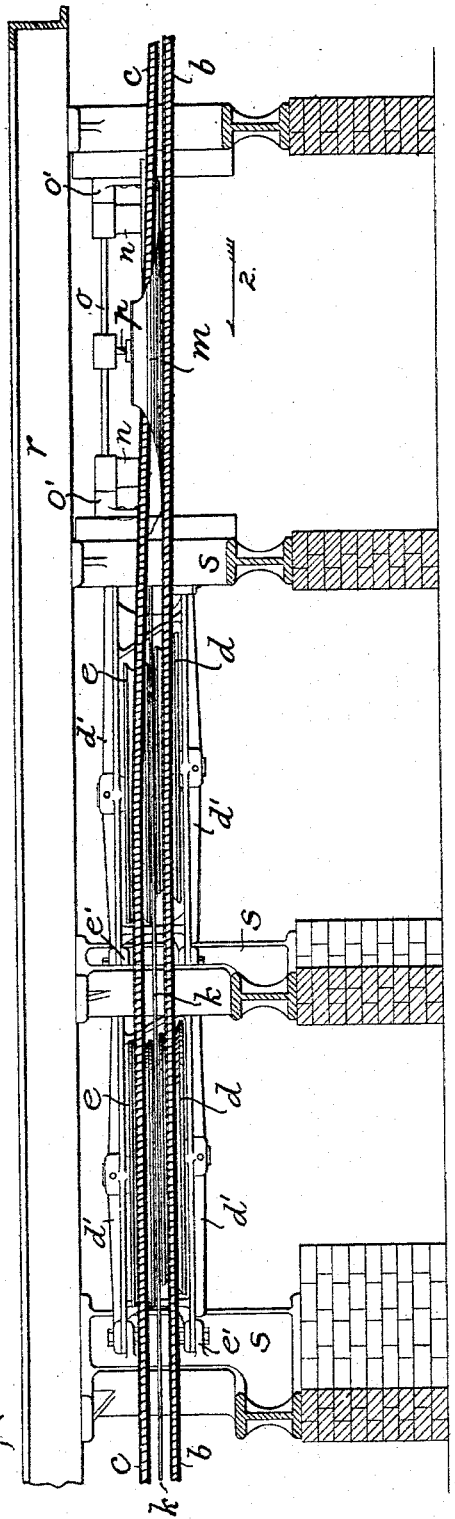

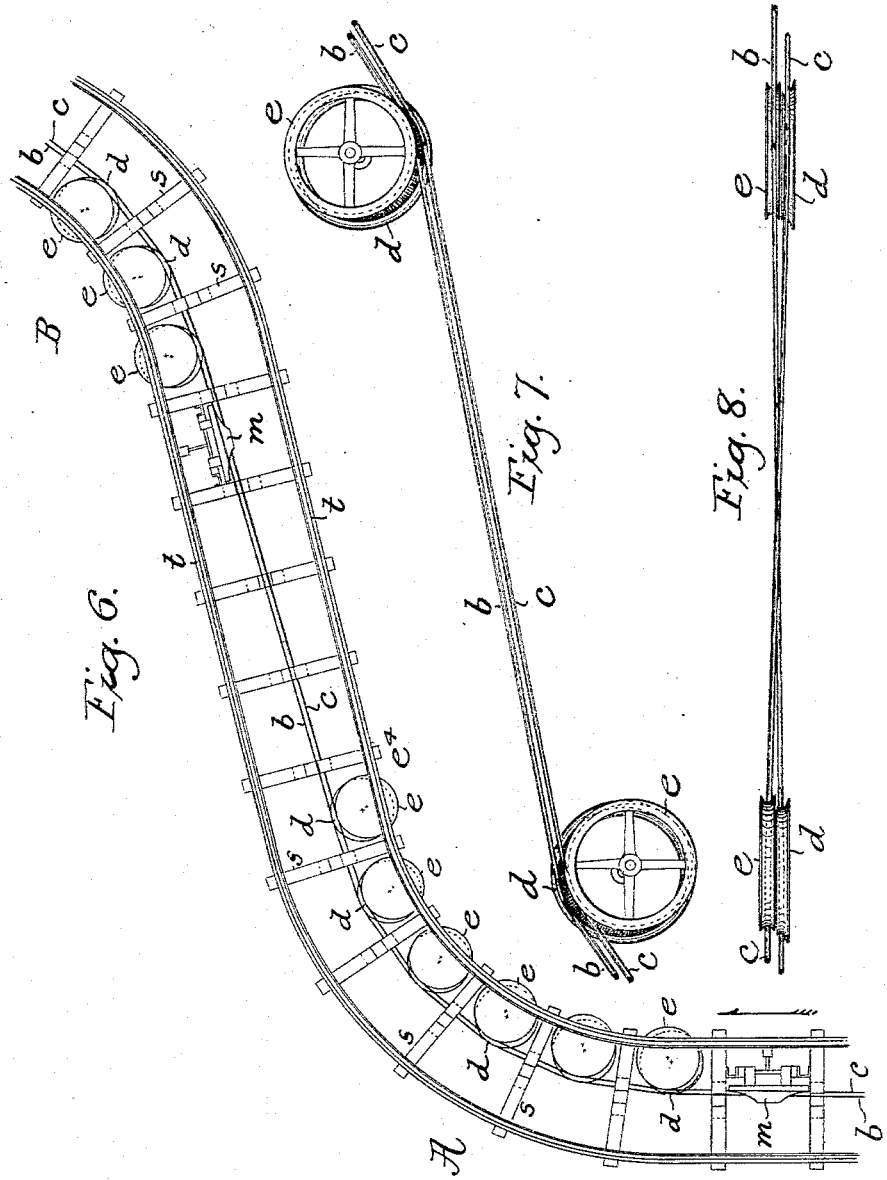

UNITED STATES PATENT OFFICE.

MINOTT W. SEWALL, OF NEW YORK, N. Y.

CABLE RAILWAY.

SPECIFICATION forming part of Letters Patent No. 533,562, dated February 5, 1895.

Application filed January 18, 1893. Serial No. 458,760. (No model.)

*To all whom it may concern:*

Be it known that I, MINOTT W. SEWALL, a citizen of the United States of America, residing in the city, county, and State of New York, have invented certain new and useful Improvements in Cable Railways, of which the following is a specification.

The present invention relates to that class of cable railway structures in which two cables are employed, both of which are in position for use when desired, and which may be moving one at a different speed from the other, or one may be moving and the other one at rest ready for use should the other or its driving machinery become disordered.

The improvement is particularly directed to the curve construction of such structures wherein is arranged one or more pairs of curve-sheaves arranged to support the two cables in their travel around a curve from one straight or tangent portion to another in such manner that the cable will be properly and surely returned to its curve-sheave after the passage of the cable grip.

The invention is also directed to the proper location of the curve-sheaves, in each of two adjacent curves extending in opposite directions, so that the cables shall pass from the sheaves of one pair to the sheaves of the next pair without such a crossing as will interfere with the operation of the cable-grip, and so that a cable-grip having a fixed vertical position with respect to the conduit may be employed.

As a better understanding of the improvement will be had from a detailed description of the same, such description will now be given, reference being had to the accompanying drawings forming a part hereof, in which drawings—

Figure 1:
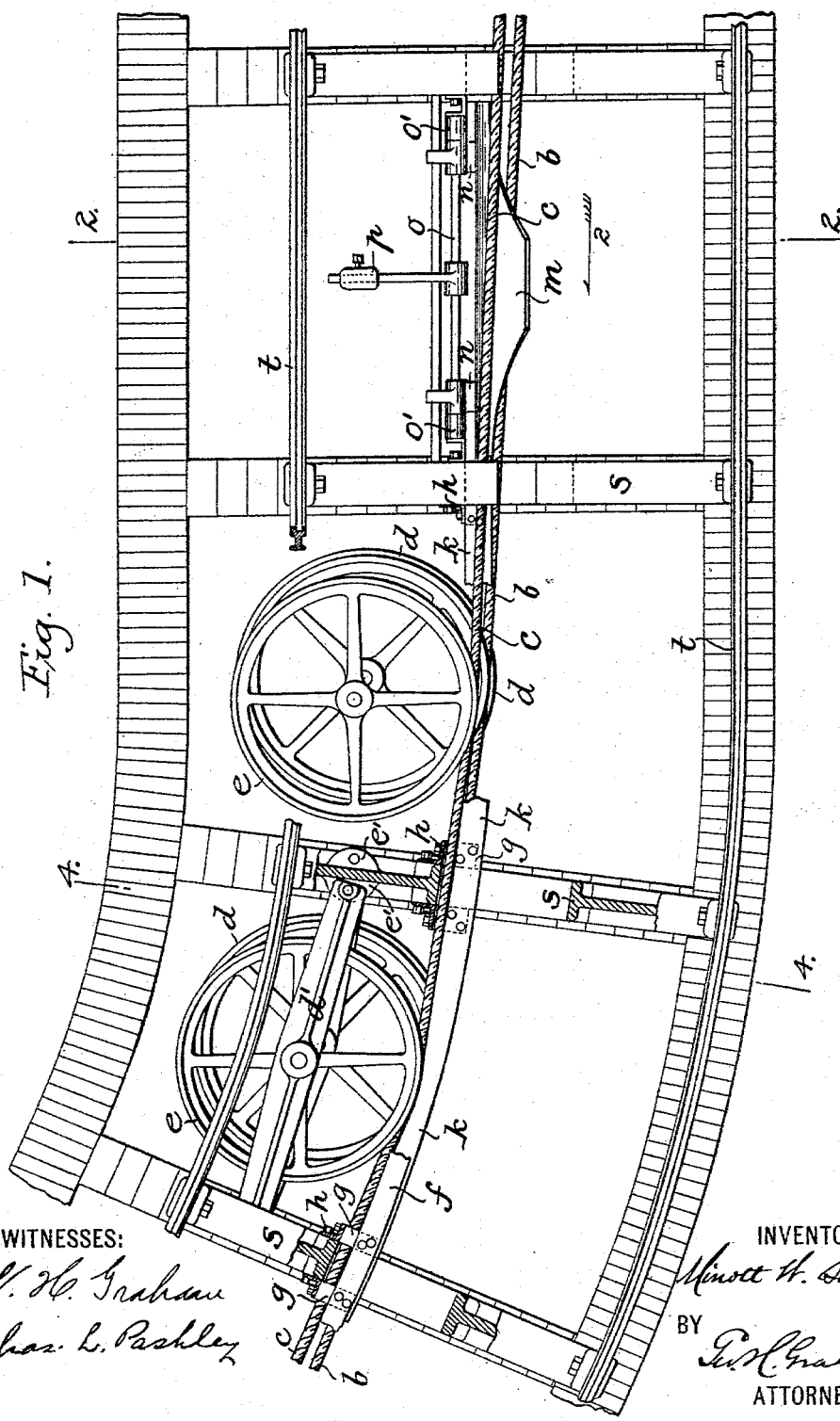
Figure 2:
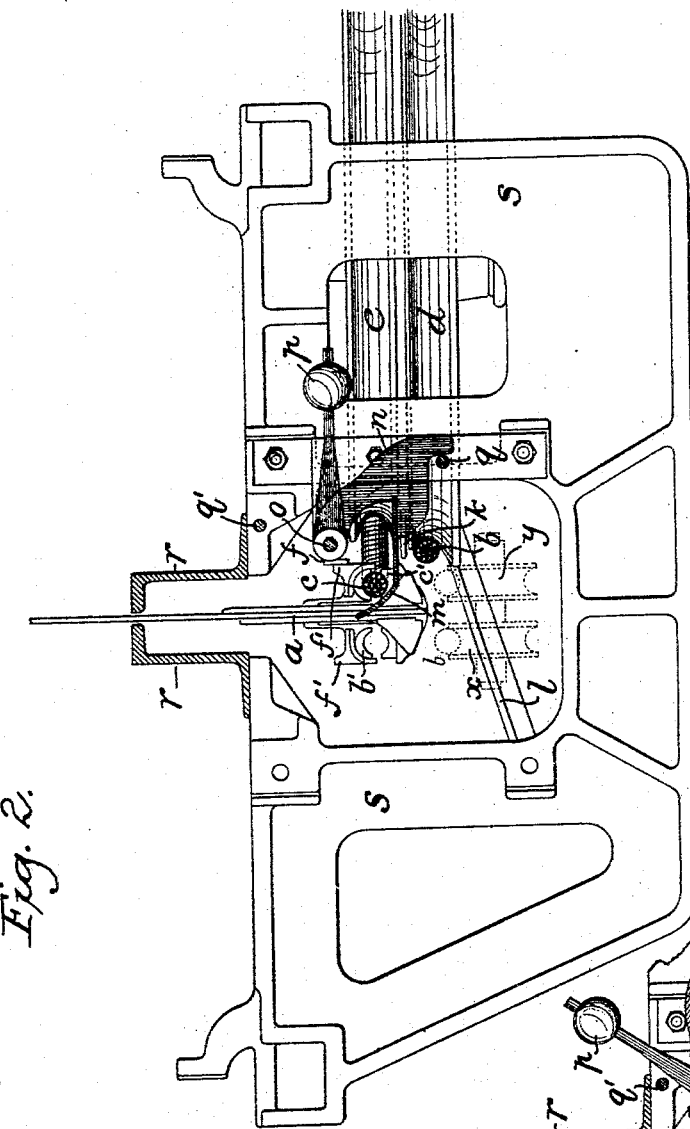
Figure 3:
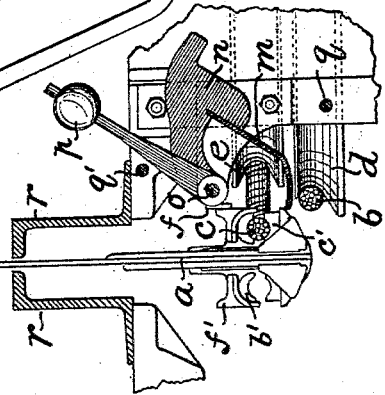

Figure 1 is a plan view of a portion of a cable railway structure showing particularly a portion of a curve with two sets of curve-sheaves, a portion of the track-rail being broken away and the slot rails being omitted. Fig. 2 is a vertical cross section taken on the line 2, 2, of Fig. 1, the track rails being omitted and the cable grip clutching the upper cable shown as having just passed the movable cable guide. Fig. 3, is a similar view of a portion of Fig. 2, showing the cable grip just passing the cable guide, and illustrating the movement of the guide to permit the grip to pass. Fig. 4 is a cross section taken on the line 4, 4, of Fig. 1, the track rails and road bed being shown, with the cable grip taking the cable from the lower sheave. Fig. 5 is a central vertical section of the structure shown in Fig. 1, showing the curve-sheaves, cables and cable guide in elevation; the lateral bearing rail *f*, being omitted. Fig. 6, is a diagram of two adjoining curves extending in opposite directions with a short tangent between them, illustrating the manner in which the cables pass from the last sheaves in one curve to the first sheaves in the next curve without crossing. Fig. 7 is a plan, and Fig. 8 is a side view illustrating more clearly the arrangement of cables passing from the last sheaves of one curve to the leading sheaves in the next curve.

So far as the present invention is concerned the general construction of the conduit may be varied within wide limits.

The structure as herein shown or such portion thereof as is necessary to a proper understanding of the invention, embraces a series of curve-yokes *s*, arranged a suitable distance apart and providing as usual a support for the track rails *t*, and the slot rails *r*, with the usual central gap or space for the cables *b* and *c* and the cable grip *a* below the slot. At proper intervals along the curve there is supported preferably in the space between adjoining curve-yokes *s*, pairs of curve-sheaves *d*, *e*, each of which are mounted in bearings in a pair of united bridge bars *d'* spanning the space between adjacent curve-yokes *s*, *s*, the ends of which bars are securely bolted to flanges *e'* that project from the webs of the curve-yokes. The curve-sheaves have flanged and grooved rims, and also have their axes arranged in a vertical line, but are preferably so disposed with relation to each other that the lower sheaves extend slightly forward and a little in the lead of the upper sheave, as is clearly shown in each of the figures, thereby permitting the axial pin of the under sheave to be withdrawn and such sheave removed without necessarily disturbing the upper sheave.

The pairs of curve-sheaves *d*, *e*, support the two cables *b*, *c*, in such position that the cable grip *a* hereinafter more particularly referred to, while clutching one of the cables may travel onward without interfering with the other one. The cable $c$ passing in contact with the upper sheaves $e$ may be termed the inner cable as it normally lies nearer the center of the curve; while the other cable $b$, passing around the lower sheaves $d$, may be termed the outer cable as it normally lies farther away from the center of the curve.

The cable grip $a$, is of the usual construction, and in itself forms no part of the present invention, except that such grip is mounted and carried onward in a fixed vertical position, and is provided with two gripping jaws $b'$, $c'$, instead as in some prior constructions of arranging the grip for automatic change in its vertical position to adapt it while clutching one cable to escape the other in passing around a reversed curve. The under side of the cable-grip is arranged as is shown in Fig. 2, to pass freely above the supporting sheaves $x$, $y$, in the straight portions of the railway, without danger of touching one or the other of the cables extending along such straight portions and supported by said sheaves $x$ and $y$.

Immediately in advance of the leading pair of curve-sheaves $d$, $e$, there is mounted a movable cable guide or guide plate $m$, that is carried by a pair of arms $n$, rigidly connected to a bar $o$, and the whole adapted to swing in fixed bearings $o'$ that are bolted to the adjacent curve-yokes $s$. The guide-plate $m$, extends between the two cables $b$, $c$, without touching either of them whether either one of them be clutched by the grip or are simply in their normal position. The outer end of the guide plate $m$ is curved upwardly as shown in Fig. 2, so that when in its normal position it will partially surround the outer side of the upper or inner cable $c$ and thus direct said cable when distended from its curve-sheave by the passing grip back to its proper sheave $c$; and at the same time such outer end of the guide-plate lies between the upper or inner cable $c$ and the lower or outer cable $b$ both when said cable lies in its normal position against its curve-sheave and when it is distended from such sheave by the passing grip, and is thus in position to direct said cable $b$ back to its proper sheave $d$ without liability of fouling with the other cable $c$.

The cable guide-plate $m$ is held in its normal position as shown in Figs. 1, 2 and 5, with its arm $n$ held against a limiting stop $q$, by a weighted arm $p$, secured to the bar $o$, and moving bodily with the guide-plate whenever it is rocked to one side to permit the unobstructed passage of the cable grip $a$. Too great a movement of the guide-plate in the opposite direction is prevented by another stop $q'$. Both ends of the cable-guide-plate are inclined as shown in Figs. 1 and 5 so that when the cable grip $a$, traveling in the direction of the arrow 2, in Figs. 1 and 5, reaches the guide plate, the forward end of the cable grip will bear against the leading inclined edge of the guide-plate, and, riding against it, will gradually bear or rock it to one side and will finally rock it into the position shown in Fig. 3; and as the cable grip leaves the guide-plate $m$ the receding or other inclined edge of said plate in its tendency to return to the normal position, now bearing against the cable grip will cause the guide plate to gradually return without shock to said normal position as shown in Fig. 2, ready to act should occasion require to guide the distended cable, $c$ or $b$, that may be clutched by the cable grip, back to the groove of the proper curve-sheave. In this movement of the guide-plate $m$ it will be noticed that its outer end has been carried down so as to lie above or below the cable that is not clutched by the grip, so that during the distention of the one cable the other may not accidentally ride into the groove of the other curve-sheave.

In order to keep the cable grip in its central position under the slot as well as to support it against lateral movement under the strain of the cable in passing around the curve, there is provided a fixed bearing rail $f$, extending along the curve and supported by brackets $g$, immediately above and outside the rim of the upper curve-sheaves $e$ as shown in Fig. 4, and partially shown in Fig. 1, against which rail $f$ one or the other of a pair of bearing faces $f'$ on the grip $a$ is adapted to bear under the tension of the cable. The brackets $g$ may be supported from the curve-yokes $s$, by a vertical plate or angle $h$, bolted to the yoke. There is also provided and extending throughout the length of the curve a separating rail $k$, bolted to the brackets $g$ in a fixed position between the several pairs of curve-sheaves $d$, $e$, as shown in Figs. 1, 4 and 5. The outer edge of this separating rail extends beyond the flange of the upper curve-sheave $e$ and serves along the length of the curve to prevent the cables from becoming entangled or riding the one on the other. The cables are also guarded from sagging beneath the lower sheave $d$, by an inclined guard $l$, bolted across the gap of each yoke, and extending downward from a point in line with groove of said lower sheave, as seen in Fig. 4.

In approaching the curve of the cable railway the cables $b$, $c$, will lie in their respective carrying sheaves $x$, $y$, as indicated by the dotted lines in Fig. 2, and from the last carrying sheave $y$ the cable $c$, will pass upward above the guide-plate $m$, onto the upper or inner curve-sheave $e$ and thence onward along the curve on the several similar succeeding sheaves $e$. The other cable $b$ will likewise pass from the last carrying-sheave $x$ below the guide-plate $m$ onto the lower curve-sheave $d$, and thence onward on the several similar succeeding sheaves $d$.

If the cable-grip $a$ is clutched to the innermost cable $c$, in passing from the last carrying sheave $y$, the grip will come in contact with and momentarily swing to one side the guide plate $m$, which, as soon as the grip passes, immediately resumes its normal position by reason of its weighted arm $p$ (it might be a spring) ready and in position to direct, should occasion require, the cable $c$ back onto the curve-sheave $e$, from which the cable has been distended by the passing grip. The advantage of the guide-plate $m$ in properly directing this cable back to its sheave, or being in position to direct such cable back to its proper sheave, will be apparent when it is considered that the tension of the cable is constantly varying and may or may not have any sag, and that the position of the cable in the passing grip is at some distance in a longitudinal plane from the groove of its sheave $e$, and that the grip will have to move so far ahead of a given sheave $e$, that the versed sine of the angle between the grip and the sheave becomes equal to the distance the cable is extended in a horizontal plane from its normal position in the groove in said sheave before it can again rest against such sheave. In consequence of this distance of the grip in advance of the curve-sheave before the cable will naturally rest against the sheave, sufficient sag in the cable may occur between the grip and the last carrying-sheave $y$ to cause the cable to miss its sheave $e$ and pass, it may be, into the under sheave $d$; so that in the present case the movable guide or guide-plate $m$, returning to its normal position at some time ahead of any liability of the return of the distended cable effectually guards against such displacement and positively directs the cable back into the groove of its proper sheave $e$.

The leading inclined edge of the guide-plate $m$ is preferably formed to give gentle movement to said plate by the passing grip $a$. Its extreme end serves as a riding edge which bears on the side or lower jaw of the grip while the guide plate is in extreme backward position; and the receding inclined edge of said plate permits its easy and early return to normal position immediately in rear of the grip.

As the cable grip $a$ passes beyond the first pair of curve-sheaves and the cable is again resting against its proper curve-sheave $e$, it naturaly returns to its place in the succeeding curve sheaves $e$; and from the last sheave $e$ it also naturally falls onto the succeeding carrying sheave in the tangent beyond the curve—the distance at which such carrying sheave is placed and the width of the flare of its rim being sufficient to practically overcome any danger of displacement. Such first carrying sheave may, however, if desired, be set at such an angle as to compensate for any lack of alignment.

When the cable grip $a$ is clutched to the other or outermost cable $b$, said cable is not only distended laterally from its curve-sheave $d$, but is drawn vertically away from said sheave. The tendency of the lower cable $b$ in such case in leaving the grip is to take the position of the upper cable on the first curve-sheave $e$ instead of its own place on the curve-sheave $d$. The sag of the cable at the chord distance of the line of movement of the grip from the curve-sheave—which gives the versed sine of the angle—is usually in practice not sufficient to carry the cable $b$ far enough below its position in the grip as is necessary to cause it to naturally return to its proper curve-sheave $d$. In such case the guide or guide-plate $m$ first guards the returning cable $b$ from striking the cable $c$ and then positively directs said cable $b$ back from its lateral and vertical displacement onto its proper sheave $d$. After the cable $b$ has been thus directed onto the first lower sheave $d$ it naturally returns onto the succeeding lower sheaves around the curve, the upper flange of said sheaves holding the cable down should there be any tendency to lift, and from the last lower curve-sheave $d$ the cable $b$ will naturally fall onto its proper carrying sheave $x$ in the tangent following the curve.

In addition to the upper flange of the lower curve-sheaves $d$, the separating rail $k$ serves to prevent throughout the entire length of the curve the outer cable as $b$ from riding up onto or against the upper sheave $e$, should any accident occur, or, on a very sharp curve should the angle from the advanced grip to the curve sheave which takes the cable immediately behind it to be very large. The rail $k$ also prevents the cable from riding from one sheave to the other should the flange of the sheave rim break or the cable strand; and between adjacent pairs of sheaves prevents the sag of the upper cable from striking the lower one.

In Fig. 6 there is illustrated a portion of a cable railway in which the curve A leads by a short tangent into another curve B directed in an opposite direction to that of the curve A. In such case it is important to avoid any crossing of the two cables in a horizontal plane, and hence the inner cable $c$ passing the curve A is the upper one and travels on the upper curve sheaves $e$, but from the last curve-sheave $e$, the said cable passes to the curve B below the guide plate $m$ (instead of above it as in approaching the curve A), and thence onto the first and succeeding under curve-sheaves $d$ of said curve B. In like manner the outermost cable $b$ passes around the under curve-sheaves $d$ of the curve A and from the last sheave of that curve passes upward toward the other curve B over the guide plate $m$ (instead of under it as in the curve A) and thence against the upper curve-sheaves $e$ of said curve B. This change in position of the two cables from the last sheaves of curve A to the first sheaves of curve B is illustrated in Figs. 7 and 8. The apparent crossing of the cables in Fig. 8, is caused by this change from one horizontal plane to another. That they do not cross actually is apparent from Fig. 7 which shows them when viewed from a position directly above. This manner of leading the cables to a curve as B leading in a direction the reverse of the adjoining preceding curve as A supports the cable on the curve-sheaves so that they bear the same relation to the jaws of the passing cable-grip in said second curve B as they did in the curve A. Thus, if it be understood that the innermost jaw of the cable grip taking the center of the curve as a center should take only the cable of the upper curve-sheaves and the outermost jaw should only take the cable from the lower curve-sheaves, it will be apparent that in passing around two curves as A and B what is the inner jaw of the grip in the curve A will become the outer jaw in passing the curve B, and vice versa. Hence the change in position of the cables from the upper curve-sheaves in one curve to the lower curve-sheaves in the succeeding reversed curve will cause the cables to occupy such relation to the respective jaws of the cable grip that the cable on the upper curve sheaves will always belong to the jaw on the inner side of the grip, while the cable on the lower curve sheaves will always belong to the jaw on the outer side of the grip. In this case in all curves to the right as in the curve A the cable $c$ will be the upper one and in all curves to the left as in the curve B, the cable $b$ will be the upper one. Whether the cable grip be clutched to the upper or to the lower cable in passing from one curve to the other directed in an opposite direction, no crossing of the two cables occur in a horizontal plane as is seen in Fig. 7, so that the unclutched cable forms no obstruction to the passing grip, and little or no undue wearing of the idle cable by contact with the grip takes place.

What is claimed is—

1. In a cable railway employing a plurality of cables, the combination of two or more cables, the curve-sheaves therefor, and a movable guide mounted adjacent to said curve-sheaves and extending between the cables and adapted to insure the return of the cables or either of them to the proper curve-sheave after the passage of the cable-grip, substantially as described.

2. In a cable railway employing two cables, the combination of two cables, a pair of curve-sheaves therefor with their axes vertical, and a movable guide mounted adjacent to said curve-sheaves and normally extending between the two cables and common to both cables adapted to insure the return of each to its proper curve-sheave after the passage of the cable-grip, substantially as described.

3. The combination with the two cables, the supporting sheaves therefor, and the pair of curve-sheaves arranged parallel one to the other with vertical axes, of a movable guide interposed between the carrying sheaves and the curve-sheaves, substantially as described.

4. In a cable railway, the combination with the two cables and a cable grip having a constant position vertically in the cable conduit, of a pair of curve-sheaves for the cables in one curve of the railway and another pair of curve-sheaves in the next succeeding curve of the railway directed in the reverse direction to the other curve, the upper sheave of one pair and the lower sheave of the other pair being common to the same cable, and a fixed support for each of the curved sheaves substantially as described.

5. In a cable railway, the combination with the two cables and a cable grip having a constant position vertically in the cable conduit, of a pair of curve-sheaves for the cables in one curve of the railway, another or second pair of curve-sheaves in the next succeeding curve of the railway directed in the reverse direction to the other curve, the upper sheave of one pair and the lower sheave in the other pair being common to the same cable, and a movable guide mounted in advance of the said second pair of curve-sheaves and extending between the cables to insure the return of either or both cables to their proper sheave on the passing of the cable grip, substantially as described.

6. In a cable railway, the combination of the two cables, the plurality of pairs of curve-sheaves for the cables, and the separating rail supported along the curve and between the sheaves of each pair to prevent one cable from touching the other, substantially as described.

7. In a cable railway, the combination of the cable grip, the motor cable, the curve-sheave therefor, and a movable cable guide normally extending in the path of the cable grip and adapted to be moved to one side by the cable grip, substantially as described.

8. In a cable railway, the combination of the motor cable, the curve-sheave therefor, a pivoted cable-guide mounted in advance of the curve-sheave, upon the inner side of the cable and extending outward beyond the normal line of the cable, and a weight for the cable-guide against and by which weight the cable-guide may be rocked from and returned to its normal position substantially as described.

9. In a cable railway, the combination of two motor-cables, the curve-sheaves therefor, a pivoted cable-guide mounted in advance of the curve-sheaves and extending between the two cables, and a weight for holding the cable-guide in position and returning it after being rocked, substantially as described.

10. In a cable railway, the combination of a motor cable, a curve-sheave therefor, a cable-guide having inclined edges and mounted to rock in bearings in advance of the curve-sheave, and a cable-grip adapted to bear against and rock said cable guide, substantially as described.

In witness whereof I have hereunto set my hand in the presence of two subscribing witnesses.

MINOTT W. SEWALL.

Witnesses:
GEO. H. GRAHAM,
E. L. TODD.